United States Patent
Neudeck

(10) Patent No.: US 6,461,003 B1
(45) Date of Patent: Oct. 8, 2002

(54) CORNER CUBE ARRAYS AND MANUFACTURE THEREOF

(75) Inventor: Gerold W. Neudeck, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/451,073

(22) Filed: Nov. 30, 1999

Related U.S. Application Data

(63) Continuation of application No. PCT/US97/10248, filed on Jun. 12, 1997.

(51) Int. Cl.$^7$ .............................................. G02B 5/122
(52) U.S. Cl. ...................... 359/529; 117/84; 117/902; 117/903; 359/530
(58) Field of Search ................................. 359/528, 529, 359/530; 117/84, 902, 903

(56) References Cited

U.S. PATENT DOCUMENTS

| | | |
|---|---|---|
| 4,066,236 A | 1/1978 | Lindner |
| 4,085,314 A | 4/1978 | Schultz et al. |
| 4,095,773 A | 6/1978 | Lindner |
| 4,491,923 A | 1/1985 | Look |
| 4,582,885 A | 4/1986 | Barber |
| 4,775,219 A | 10/1988 | Appeldorn et al. |
| 4,852,452 A | 8/1989 | Barry et al. |
| 4,938,563 A | 7/1990 | Nelson et al. |
| 4,992,699 A | 2/1991 | McClure et al. |
| 5,371,608 A | 12/1994 | Muto et al. |
| 5,557,836 A | 9/1996 | Smith et al. |
| 5,585,164 A | 12/1996 | Smith et al. |
| 5,600,484 A | 2/1997 | Benson et al. |

OTHER PUBLICATIONS

Precision Crystal Corner Cube Arrays for Optical Gratings formed by (100) Silicon Planes with Selective Epitaxial Growth, Gerald W. Neudeck, Jan Spitz, Julie C. H. Change, John P. Denton, and Neal Gallagher; *Applied Optics*, vol. 35, No. 19, Jul. 1, 1996.

Characterization of Sidewall Defects in Selective Epitaxial Growth of Silicon, R Bashir, G. W. Neudeck, Y Haw, E. P. Kvam, J. P. Denton; *J. Vac. Sci. Technol.* B 13(3), May/Jun. 1995.

The Chemistry and Growth of Movpe–Based Selective Epitaxy, T. F. Kuech, S. Nayak; Low Dimensional Structures prepared by Epitaxial Growth of Regrowth on Patterned Substrates, 207–217, 1995 Kluwer Academic Publishers.

The Selective Epitaxial Growth of Silicon, M. R. Goulding; *Materials Science and Engineering*, B17 (1993) 47–67.

Selective Epitaxy of Compound Semiconductors: Novel Sources, T. F. Kuech; *Semicond. Sci. Technol.* 8 (1993) 967–978.

A Polysilicon Contacted Subcollector BJT for a Three–Dimensional BiCMOS Process, R. Bashire, S. Venkatesan, G. W. Neudeck, J. P. Denton; *IEEE Electronic Device Letters*, vol. 13, No. 8, Aug. 1992.

Recent Advances in Metal–Organic Vapor Phase Epitaxy, Thomas F. Kuech; *Proceedings of the IEEE*, vol. 80, No. 10, Oct. 1992.

A Fully Planar Method for Creating Adjacent "Self–Isolating" Silicon–on–Insulator and Epitaxial Layers by Epitaxial Lateral Overgrowth, J. L. Glenn, Jr., G. W. Neudeck, C. K. Subramanian, J. P. Denton; *Appl. Phys. Lett.* 60(4), Jan. 27, 1992.

*Primary Examiner*—Jan Ludlow
(74) *Attorney, Agent, or Firm*—William F. Bahret

(57) ABSTRACT

A corner cube array device (20) is disclosed having a silicon substrate (30) with a generally cubic crystal lattice. A number of silicon crystal projections (62a, 62b, 62c, 62d, 62e, 62f, 62g) extend from the substrate (30). The projections (62a, 62b, 62c, 62d, 62e, 62f, 62g) each have three generally planar surfaces, as exemplified by surfaces (70, 72, 74) of projection (62a), to provide a cube corner shape. Projections (62a, 62b, 62c, 62d, 62e, 62f, 62g) are spaced apart from each other in accordance with a predetermined spatial pattern to define a cube corner array (60) suitable for optical device applications and the mass production of articles having a substantially similar corner cube array shape.

30 Claims, 8 Drawing Sheets

CORNER CUBE ARRAYS AND MANUFACTURE THEREOF

CROSS-REFERENCE TO RELATED APPLICATIONS

The present application is a continuation of International Patent Application Number PCT/US97/10248 filed Jun. 12, 1997 and published in English Dec. 17, 1998.

BACKGROUND OF THE INVENTION

Trihedral structures have found broad application in optical devices. In one typical application, these structures are arranged in a pattern to provide a retroreflector capable of reflecting light back along its incident path over a wide range of incident angles. These structures may be transparent, relying on internal reflection, or coated with reflective material. To achieve optimal results, it is often desired that the trihedral structure resemble a cube corner as closely as possible—having three mutually perpendicular surfaces that are optically flat.

For some applications, cube corners are configured to retroreflect light in a designated pattern or divergence profile. U.S. Pat. Nos. 4,938,563 to Nelson et al. and 4,775,219 to Appeldorn et al. are cited as representative examples of this type of device. Retroreflectors have been used to produce flexible reflective tapes, road signs, and various safety devices. In addition, retroreflectors have been arranged to convey information. U.S. Pat. Nos. 4,491,923 to Look and 4,085,314 to Schultz et al. are cited as examples of this type of arrangement. Indeed, a wide variety of systems have been proposed which incorporate cube corner reflective elements such as the optical scanner of U.S. Pat. No. 5,371,608 to Muto et al. and the satellite defense system of U.S. Pat. No. 4,852,452 to Barry et al.

Frequently, retroreflective devices are mass produced from tooling patterned after the corner cube structure of a master mold. For instance, cube corner retroreflective sheeting is manufactured by first making a master mold that includes an image of a desired cube corner element geometry. This mold may be replicated using, for example, an electrochemical replication process such as nickel electroplating to produce tooling for forming cube corner retroreflective sheeting. U.S. Pat. No. 5,156,863 to Pricone, et al. provides an illustrative overview of a process for forming tooling used in the manufacture of cube corner retroreflective sheeting. Conventional methods for manufacturing the master mold include pin-bundling techniques, direct machining techniques, and laminate techniques. Each of these techniques has various limitations—especially when both small cube corner dimensions and high optical performance are desired.

For the direct machining approach, grooves typically are formed in a unitary substrate to form a cube corner retroreflective surface. U.S. Pat. Nos. 3,712,706 to Stamm and 4,588,258 to Hoopman provide illustrative examples of direct machining techniques. Direct machining techniques offer the ability to accurately machine very small cube corner elements (e.g. less than about 1.0 millimeters) which is desirable for producing a flexible retroreflective sheeting. However, it is not presently possible to produce certain cube corner geometries that have a very high effective apertures at low entrance angles using direct machining techniques. By way of example, the maximum theoretical percent active aperture of the cube corner element geometry depicted in U.S. Pat. No. 3,712,706 is approximately 67%. U.S. Pat. Nos. 5,600,484 to Benson et al., 5,585,164 to Smith et al., and 5,557,836 to Smith et al. are cited as additional examples of various cube corner machining techniques.

To overcome these limitations, the surfaces of each cube corner should be optically flat and should join adjacent surfaces at well-defined angles—even if spacing between adjacent cube corners is on the order of a few hundred micrometers. Thus, there is a need for a more precise corner cube array. Preferably, the device may be provided as a unitary piece and is readily applicable to replication techniques. In addition, it is preferred that a technique be provided to form an array of cube corner-shaped microstructures having cube corner spacing of less than about 200 micrometers. The present invention meets these needs and provides other important benefits and advantages.

SUMMARY OF THE INVENTION

The present invention relates to corner cube structures. Various aspects of the invention are novel, non-obvious, and provide various advantages. While the actual nature of the invention covered herein may only be determined with reference to the claims appended hereto, certain features which are characteristic of the preferred embodiment disclosed herein are described briefly as follows.

In one feature of the present invention, a corner cube array is provided that includes a (111) silicon substrate and a number of silicon crystal projections generally extending from the substrate along a [111] crystal lattice direction. The projections each have a cube corner shape with three generally planar surfaces. The surfaces are generally mutually perpendicular and generally correspond to (100), (010), and (001) crystal faces. The projections each have generally the same size and shape and have a generally uniform distribution along at least a portion of the substrate.

In another feature, a silicon substrate has a generally cubic crystal lattice and a number of elements are generally positioned apart from one another in a predetermined spatial pattern along a plane of the substrate. These elements are made from a compound selected to spatially control silicon crystal growth on the substrate. A number of silicon crystal projections extend from the plane. These projections each have three generally planar surfaces. The projections are spaced apart from each other in accordance with the predetermined pattern of the elements to provide a corner cube array.

In still another feature, a crystalline substrate is selected having a generally planar first surface substantially corresponding to a first crystal face. A predetermined spatial pattern is defined along the first surface to control crystal growth thereon. A material is deposited on the first surface to grow a number of crystals corresponding to the pattern. The crystals have generally the same chemical composition and crystal lattice arrangement as at least a portion of the substrate. The crystals extend from the first surface to define second, third, and fourth generally planar surfaces. The second, third, and fourth surfaces substantially correspond to second, third, and fourth crystal faces. The second, third, and fourth crystal faces are oblique relative to the first crystal face. This technique may be utilized to provide a corner cube array structure useful to make replication tooling. The replication tooling may be operated to provide a number of articles each having a corner cube array shape.

In a further feature, a corner cube array is made by processing a silicon substrate having a cubic crystal lattice. A number of crystal growth regions are established along the surface during processing. These regions are established in a predetermined pattern. A cube corner shaped projection is epitaxially grown on each of the regions. The projection generally extends along an [111] crystal lattice direction with three generally planar surfaces. The surfaces are generally mutually perpendicular to one another and substantially correspond to (100), (010), and (001) crystal faces. This crystal growth technique may be utilized to provide a corner cube array with cube edges less than 200 micrometers in length.

Accordingly, it is one object of the present invention to provide a crystal corner cube array.

It is another object of the present invention to grow a cube corner having crystal faces that are oblique relative to a crystal face of a substrate on which the cube corner is grown.

It is still another object of the present invention to provide cube corners spaced apart from each other by distances of less than about 200 micrometers.

It is yet another object to provide a crystal corner cube array suitable for making replication tooling.

In an additional object, a corner cube array is grown on a planar surface of a substrate using Selective Epitaxial Growth (SEG) and Epitaxial Lateral Overgrowth (ELO) techniques.

Further objects, features, aspects, advantages, and benefits of the present invention will become apparent from the drawings and description contained herein.

DESCRIPTION OF THE PREFERRED EMBODIMENT

Figure 1:
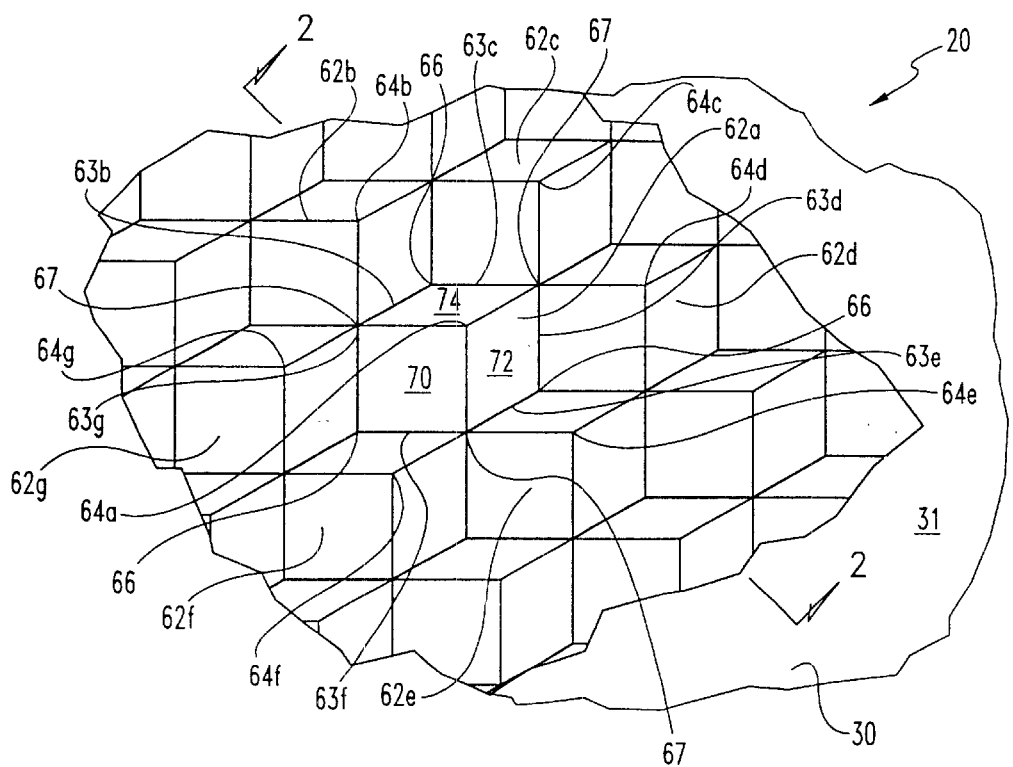
FIG. 1 is a partial perspective cutaway view of a corner cube array device of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 depicts a crystal corner cube array device 20 of the present invention. Device 20 has a silicon substrate 30 supporting a cube array 60. FIG. 1 provides a cutaway view of substrate 30 corresponding to the removal of a part of cube array 60. Substrate 30 is formed from silicon having a common cubic crystal lattice. Prior to formation of cube array 60, substrate 30 has surface 31 that is substantially coplanar with a (111) crystal face of substrate 30. Accordingly, the [111] crystal lattice direction is generally perpendicular to the view plane of FIG. 1.

Cube array 60 is formed from silicon on substrate 30. Cube array 60 has a number of projections having a cube corner shape. These projections extend from substrate 30 along the [111] crystal lattice direction. A few of these projections are specifically designated by reference numerals 62a–62g and are collectively referred to as projections 62. For projection 62a, planar surfaces 70, 72, and 74 are designated. Surfaces 70, 72, 74 are generally planar and mutually perpendicular to one another. Surfaces 70, 72, 74 intersect each other to define a trihedral shape with apex 64a. Notably, surfaces 70, 72, 74 are each oblique with respect to the (111) crystal face of substrate 30. Projections 62b–62g correspondingly have apexes 64b–64g. Apexes 64a–64g are collectively referred to as apexes 64. Similar to projection 62a, the remaining projections 62 have a trihedral shape generally defined by three mutually perpendicular surfaces. Furthermore, it should be recognized that for the preferred embodiment, the pattern of projections 62 illustrated in FIG. 1 is repeated numerous times to provide crystal corner cube array device 20.

As a representative example of each projection 62, projection 62a is further described. Projection 62a has adjoining edges 63b–63g where a surface of a corresponding one of surrounding projections 62b–62g is met. The surfaces 70, 72, 74 of projection 62a each meet the surrounding surfaces at approximately right angles. Notably, the uniform pattern of corner cube array 60 provides that each projection 62 is generally sized and shaped the same as the others and each projection 62 within the pattern is surrounded by six neighboring projections 62 in a generally symmetric arrangement. Furthermore, it should be noted by reference to projection 62a, that each projection 62 meets two surrounding projections in an alternating pattern of cube corner shaped recesses 66 and intersection points 67. Thus, at each recess 66 and point 67, three projections 62 meet.

Figure 2:
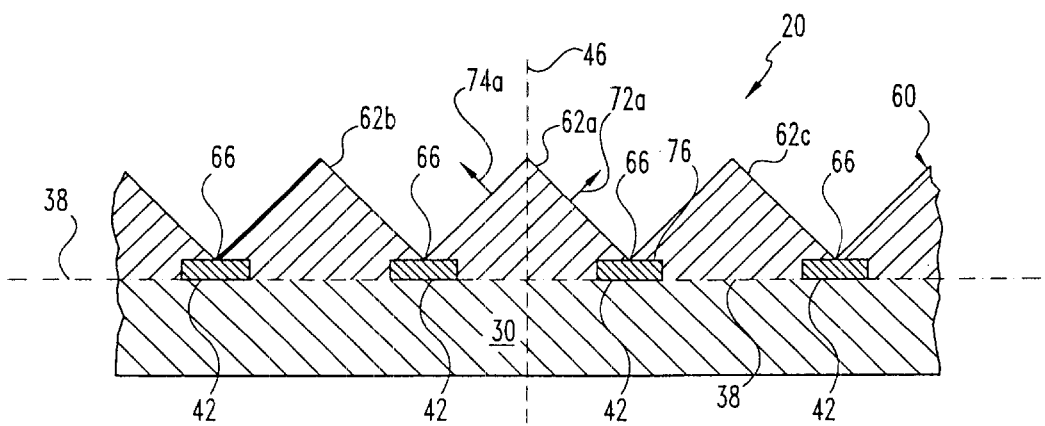
FIG. 2 is a schematic cross-section of the device of FIG. 1 taken along section lines 2—2.

Referring additionally to FIG. 2, a schematic cross-section of substrate 30 and corner cube array 60 is illustrated. FIG. 2 depicts (111) crystal plane 38 which substantially coincides with surface 31. Plane 38 generally provides an interface with substrate 30 for each projection 62. Axis 46 represents the [111] crystal lattice direction and is shown intersecting projection 62a. Similarly, other projections 62 of corner cube array 60 project from plane 38 along axis 46. At each recess 66, an element 42 is situated on plane 38. Elements 42 are preferably made from silicon dioxide ($SiO_2$) or a silicon nitride compound, such as $Si_3N_4$, $Si_xN_y$, $Si_xN_yO_z$, $Si_xN_yH_z$, in the shape of rectilinear pads spaced apart from one another in a predetermined pattern along plane 38. Other materials as would occur to one skilled in the art are also envisioned for elements 42.

Projections 62 are each formed as a cubic silicon crystal on surface 31 (plane 38) of substrate 30 through selective epitaxial growth techniques. These crystals merge with each other at adjoining edges (such as edges 63b–63g) to form corner cube array 60. Preferably, the crystals overgrow elements 42 as typified by the overgrowth region designated by reference numeral 76 in FIG. 2. This overgrowth is preferably controlled to maximize coverage of each element 42 by corresponding projections 62 so that the intersection of three mutually perpendicular surfaces results, defining recesses 66. For this crystal structure, surfaces 70, 72, 74 of projection 62a generally correspond to (100), (010), and (001) cubic crystal faces which are the common silicon crystal growing planes for selective epitaxy. Crystal lattice directions [010] and [001] are shown in FIG. 2 as arrows 72a, 74a, respectively. The other projections 62 have comparable crystallographic features.

Figure 3:
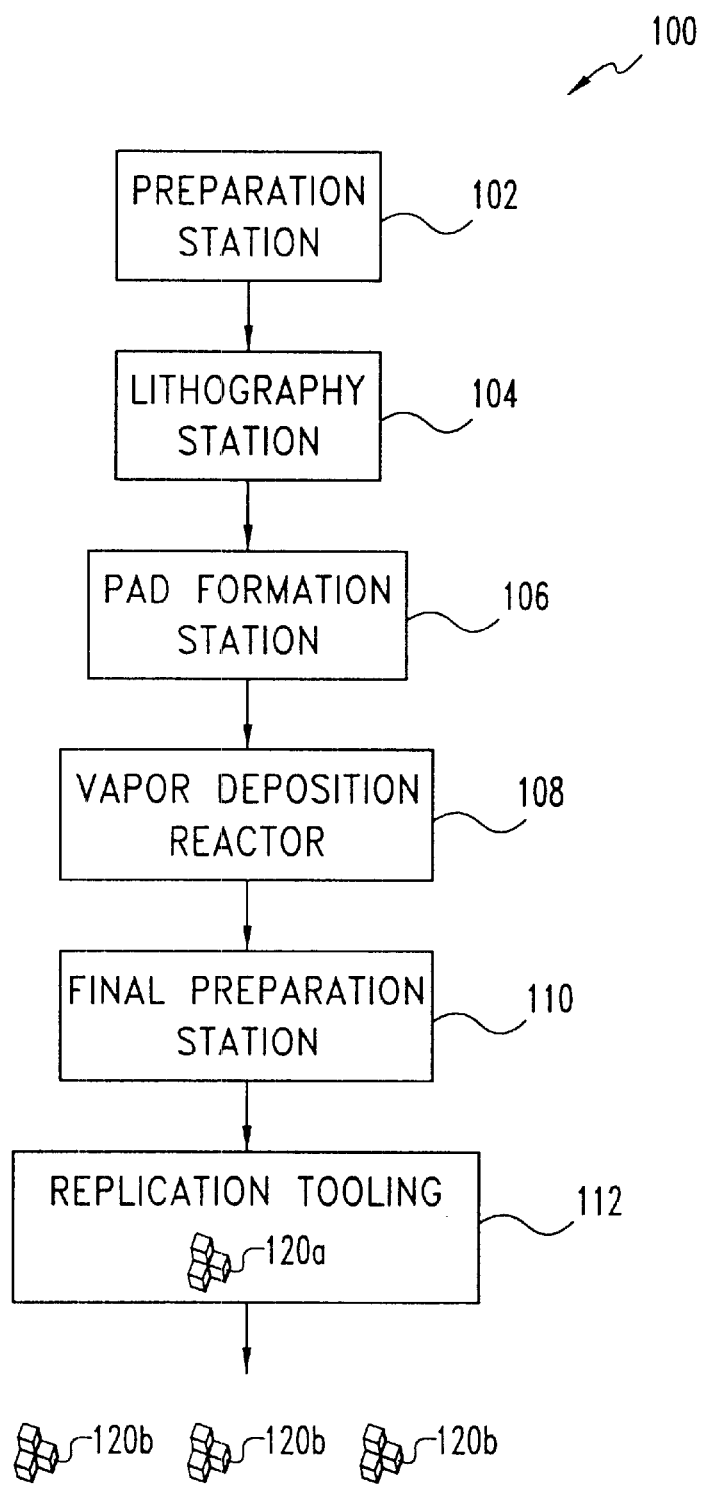
FIG. 3 is a flow diagram illustrating a processing system of the present invention.

A processing system 100 is depicted by FIG. 3. System 100 provides a crystal corner cube array device 20 as described in connection with FIGS. 1 and 2 with like reference numerals referring to like features. Collectively referring to FIGS. 1–5, at preparation station 102, a (111) silicon wafer 30a is selected and prepared for subsequent processing. Wafer 30a includes substrate 30 as depicted in FIGS. 1 and 2. A generally uniform layer of silicon dioxide ($SiO_2$) is thermally grown on substrate 30 at preparation station 102 using conventional techniques.

Wafer 30a with the $SiO_2$ layer is advanced to lithography station 104 to define a mask pattern 34 using conventional photolithographic techniques. Pattern 34 includes a number of element sites 43 schematically represented by dots in FIG. 4. Once pattern 34 is established, masked wafer 30a is treated at pad formation station 106. At station 106, masked wafer 30a is processed using standard techniques to remove portions of the silicon dioxide layer. This removal exposes surface 31 of substrate 30, leaving silicon pads 42a corresponding to lithographically defined element sites 43 of pattern 34 (see FIG. 5).

Figure 4:
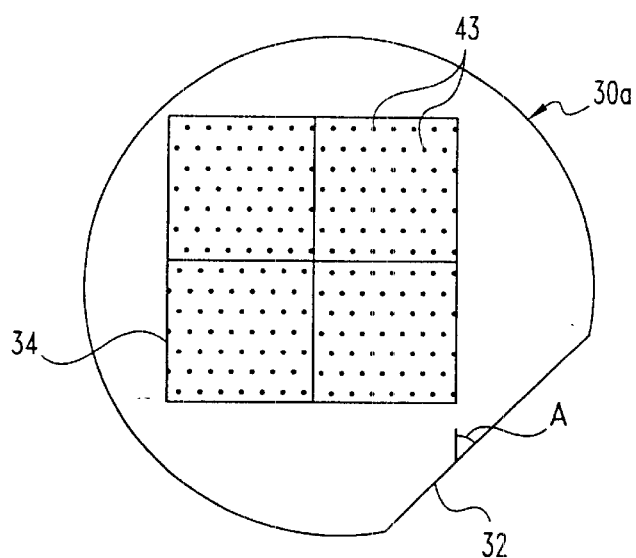
FIG. 4 is a schematic of a silicon wafer processed by the system of FIG. 3.

Preferably, pads 42a are defined with generally straight edges which may be aligned with wafer flat 32. Preferably, flat 32 is formed to be approximately perpendicular to the [110] crystal lattice direction of wafer 30a. It has been found that the orientation and geometry of pads 42a relative to flat 32 alters the cube corner arrangement of projection 62. Angle A between pattern 34 and flat 32 is illustrated in FIG. 4 which may be altered to provide different cubic crystal structures. Preferably, pads 42a are generally square having an edge generally parallel with flat 32.

Figure 5:
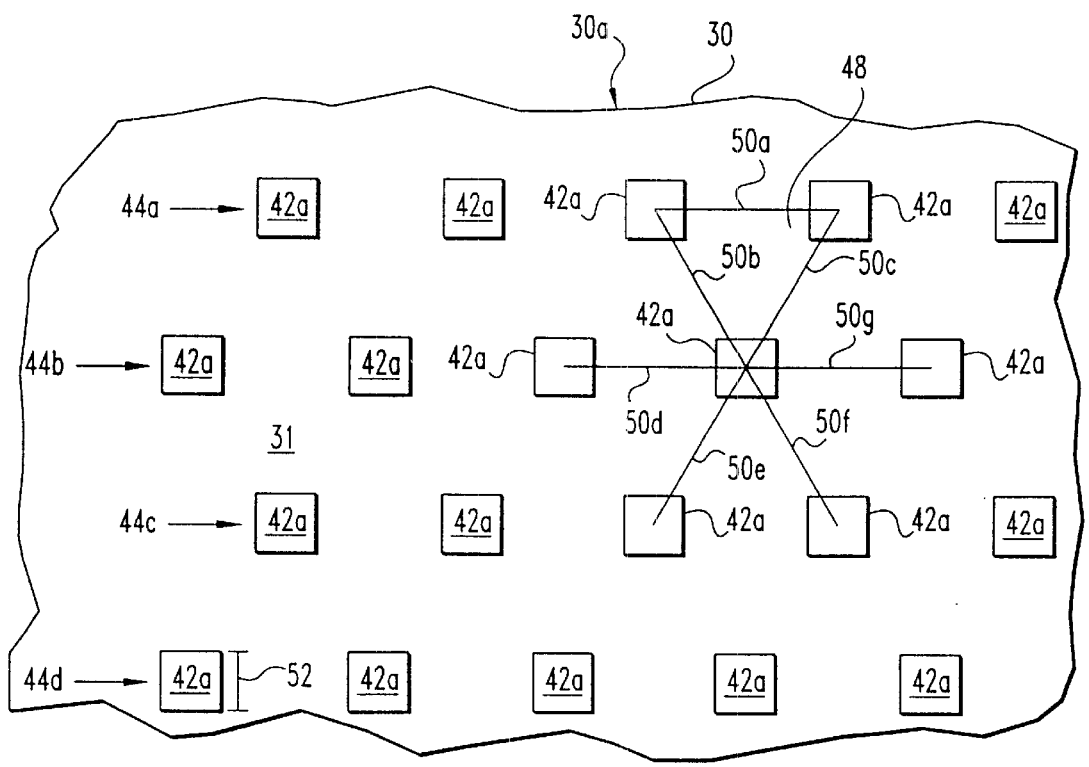
FIG. 5 is a partial top plan view of the wafer of FIG. 4 at a selected processing stage.

In FIG. 5, an enlarged view of a portion of pads 42a are illustrated along a part of substrate 30. Notably, pads 42a are arranged in staggered rows 44a–44d with surface 31 being exposed therebetween. Linear segment 50a represents center-to-center spacing between pads 42a adjacent one another in a common row 44a. Linear Segments 50b–50g represent center-to-center spacing between a selected pad 42a and each of six closest surrounding pads 42a. Preferably, the spacing between adjacent pads of a row is generally the same as represented by segment 50a. More preferably, the spacing between all of the six closest surrounding pads 42a are the same such that lineal segments 50a–50g each represent approximately equal distances. In a most preferred embodiment, each pad 42a is equidistant from its nearest neighboring pads 42a. In a preferred microstructural embodiment of the crystal corner cube array, the distance represented by segments 50a–50g is less than about 200 micrometers. In a more preferred microstructural embodiment, the distance represented by segments 50a–50g is less than about 50 micrometers. In a most preferred microstructural embodiment, the distance represented by segments 50a–50g is no more than about 1 micrometer.

Segments 50a, 50b, 50c generally define an equilateral triangle region 48. Region 48 corresponds to a base of one of projections 62 having pads 42a at each triangle corner. Notably, an apex 64 of a projection 62 corresponding to region 48 is generally equidistant from each of pads 42a in the respective corners of the triangular region. The staggered arrangement of rows 44a-d generally provides a uniform pattern of adjacent equilateral triangular regions each similar to region 48. These triangular regions correspond to adjacent crystal growth sites suitable for the uniform distribution of trihedral crystal projections 62. Preferably, the staggered row pattern of FIG. 5 is repeated numerous times to provide a crystal corner cube array. FIG. 5 also depicts distance segment 52 corresponding to an edge of one of pads 42a. Preferably, for a microstructural corner cube array embodiment, pads 52 are about 1 to 5 micrometers square.

In FIG. 3, reactor 108 is utilized for the deposition of silicon in a controlled amount to form projections 62. A Selected Epitaxial Growth (SEG) technique is employed to form projections 62. With this technique, crystal growth rate within the triangular regions corresponding to region 48 is differentiated as a function of distance from pads 42a to provide a trihedral crystal shape. In addition, a controlled degree of Epitaxial Lateral Overgrowth (ELO) onto pads 42 is permitted to sharply define recesses 66. The following references are cited as a source of additional information concerning SEG and ELO processing: (1) Neudeck et al., Precision Crystal Corner Cube Arrays for Optical Gratings Formed by (100) Silicon Planes with Selective Epitaxial Growth, 35 Applied Optics 3466 (Jul. 1, 1996); (2) Bashir et al., Characterization of Sidewall Defects in Selective Epitaxial Growth of Silicon, 13 Journal of Vacuum Science Technology 923 (1995); (3) Goulding, The Selective Epitaxial Growth of Silicon, Materials Science and Engineering p. 47 (1993).

It is believed that pads 42a resist nucleation of silicon crystals relative to the exposed triangular crystal growth regions (such as region 48) of plane 38 situated there between. The growth planes of silicon from the SEG process are in the <100> directions. As a result, corner-shaped projections each form during SEG deposition as various crystal nucleation sites within a corresponding triangular region join one another. SEG and ELO processing may be used with other crystal growth suppression site patterns, including varied spacing between suppression elements to adjust size of the crystal projections. Besides silicon dioxide, pads 42a may be formed from other silicon crystal growth suppression materials such as silicon nitride compounds. In addition, other types of crystal growth suppression techniques or elements may be employed as would occur to one skilled in the art.

After projections 62 have been formed in reactor 108, the resulting corner cube array device is processed at final processing station 110. At this point, device 20 may be coated or passivated as required for the particular application. In one embodiment, corner cube array device 20 is packaged for use as an optical grating device after suitable treatment.

FIG. 3 depicts another embodiment wherein device 20 is employed as a master mold or template to replicate low cost corner cube arrays using replication tooling 112. Replication tooling 112 includes replication mold 120a that is patterned from device 20. Tooling 112 is employed to form articles 120b having a corner cube array shape substantially corresponding to corner cube array 60 of device 20. Generally, the shape of each article 120b is imparted by contact with replication mold 120a. A schematic representation of mold 120a is shown as part of tooling 112, and articles 120b are schematically illustrated in FIG. 3 as production output of tooling 112.

Mold 120a may be made from device 20 using precision replication techniques such as, for example, nickel electroplating to form a negative copy of cube array 60. Electroplating techniques are known to one of ordinary skill in the retroreflective arts. See e.g. U.S. Pat. Nos. 4,478,769 and 5,156,863 to Pricone et al. The negative copy of cube array 60 embodied in mold 120a may then be used for forming retroreflective articles 120b having a positive copy of cube array 60. More commonly, additional generations of electroformed replicas are formed and assembled together into a larger mold. It will be noted that the original working surfaces of the cube corner array, or positive copies thereof, could also be used as an embossing tool to form retroreflective articles 120b.

A master mold may be made in accordance with the present invention to provide tooling with a structured surface suitable for the mass production of retroreflective articles such as retroreflective sheeting. The tooling may be made using electroforming techniques or other conventional replicating technology. The surface of the tooling may define substantially identical cube corner elements or may include cube corner elements of varying sizes, geometries, or orientations provided by one or more master molds. Typically, the surface of this tooling, sometimes referred to in the art as a "stamper," contains a negative image of the cube corner elements of the master mold. A single master mold replica may be used as a stamper for forming a retroreflector; however, more commonly a large number of positive or negative replicas are utilized to provide a stamper large enough to be useful in forming retroreflective sheeting. One of ordinary skill in the retroreflective arts will recognize that the working surface of each cube corner array functions independently as a retroreflector so that adjacent arrays in a mold formed from several replicas of one or more master molds may not need to be positioned at precise angles or distances relative to one another in order to perform as desired.

Retroreflective sheeting may be manufactured as an integral material, e.g. by embossing a preformed sheet with an array of cube corner elements as described in U.S. Pat. No. 4,601,861 or U.S. Pat. No. 4,332,847. Alternatively, retroreflective sheeting may be manufactured as a layered product by casting the cube corner elements against a preformed film as taught in U.S. Pat. No. 3,648,348 or by laminating a preformed film to preform cube corner elements. By way of example, effective sheeting may be made using a nickel mold formed by electrolytic deposition of nickel onto a master mold. The electroformed mold may be used as a stamper to emboss the pattern of the mold onto a polycarbonate film approximately 500 $\mu$m thick having an index of refraction of about 1.59. The mold may be used in a press with the pressing performed at a temperature of approximately 175° to 200° C.

Useful materials for making reflective sheeting are preferably materials that are dimensionally stable, durable, weatherable and readily formable into the desired configuration. Examples of suitable materials include acrylics, which generally have an index refraction of about 1.5, such as Plexiglas resin from Rohm and Haas; thermoset acrylates and epoxy acrylates, preferably radiation cured; polycarbonates, which have an index of refraction of about 1.6; polyethylene-based ionomers (marketed under the name 'SURLYN'); polyesters; and cellulose acetate butyrates. Generally an optically transmissive material that is formable, typically under heat and pressure, may be used. Other suitable materials for forming retroreflective sheeting are disclosed in U.S. Pat. No. 5,450,235 to Smith et al. The sheeting may also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer may be made of any transparent or opaque material, including colored materials, that can be effectively engaged with retroreflective sheeting. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet may be sealed in a grid pattern or any other configuration suitable to the reflecting elements. Sealing may be affected by use of a number of methods including ultrasonic welding, adhesives, or by heat sealing at discrete locations on the arrays of reflecting elements (see, e.g. U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and a release sheet to render it useful for application to any substrate without the added step of applying an adhesive or using other fastening means.

It should be appreciated that the present invention provides a technique to form crystal structures, such as cube corners, on a crystal face of a substrate; where the crystal structures have crystal growth planes which are oblique to the crystal face of the substrate. The crystal structures may be grown in patterns by applying selective epitaxial growth processes. Typically, crystal growth selectivity is provided by establishing an array of elements that resist nucleation of the crystals being grown. Epitaxial lateral overgrowth techniques may be used in conjunction with selective epitaxial crystal growth procedures to provide corner-shaped recesses.

As used herein, a "(111) substrate," "(111) silicon substrate," "(111) wafer," and "(111) silicon wafer" each refer to a device having a surface that substantially corresponds to a (111) crystal face; it being understood that this surface may deviate from an ideal (111) crystal plane by an identifiable amount.

Experimental Section

The following experimental examples are provided to exemplify selected aspects of the present invention, and are to be considered only illustrative, and not restrictive in character.

In a first example, a first three inch (111) silicon wafer was utilized. A silicon dioxide layer of about 2000 angstroms was thermally grown on the first wafer. The wafer was processed using standard photolithographic techniques to define 155 dies by removing selected regions of the silicon dioxide layer and thereby expose a generally planar silicon surface substantially corresponding to a (111) silicon crystal face. Each die defined 16 different spatial patterns of generally square silicon dioxide pads along the first (111) silicon wafer. The pads were arranged in staggered rows for each different pattern. The patterns were established by varying the center-to-center spacing of the pads from about 3 to 50 micrometers ($\mu$m) and the pad edge size from about 1 to 5 micrometers ($\mu$m). Table I provides a matrix of the pad spacing and edge size combinations utilized to provide the 16 patterns for each die as follows:

TABLE I

| Square Pad (Edge) (μm) | Spacing of Pads (Side of the Equilateral Triangle) (μm) | | | |
|---|---|---|---|---|
| 1 | 3 | 5 | 8 | 10 |
| 2 | 6 | 10 | 16 | 20 |
| 3 | 9 | 15 | 24 | 30 |
| 5 | 15 | 25 | 40 | 50 |

After formation of the pads, SEG and ELO was performed by placing the first (111) silicon wafer in a Low Pressure Chemical Vapor Deposition (LPCVD) reactor. In the reactor, the first (111) silicon wafer was exposed to hydrogen ($H_2$) at about 60 Standard Liters per Minute (SLM), dichlorosilane at about 0.22 SLM, and hydrochloric acid (HCL) at about 0.66 SLM. The reactor pressure was maintained at about 40 torr and a temperature of about 970° C. during the exposure. SEG and ELO processes were utilized to grow approximately 1.5 micrometers of epitaxial silicon crystal as measured by a (100) silicon monitor wafer present in the reactor during crystal growth on the first (111) silicon wafer. The growth rate of epitaxial crystal on the (100) silicon monitor wafer was about 0.1 micrometers per minute.

Figure 6:
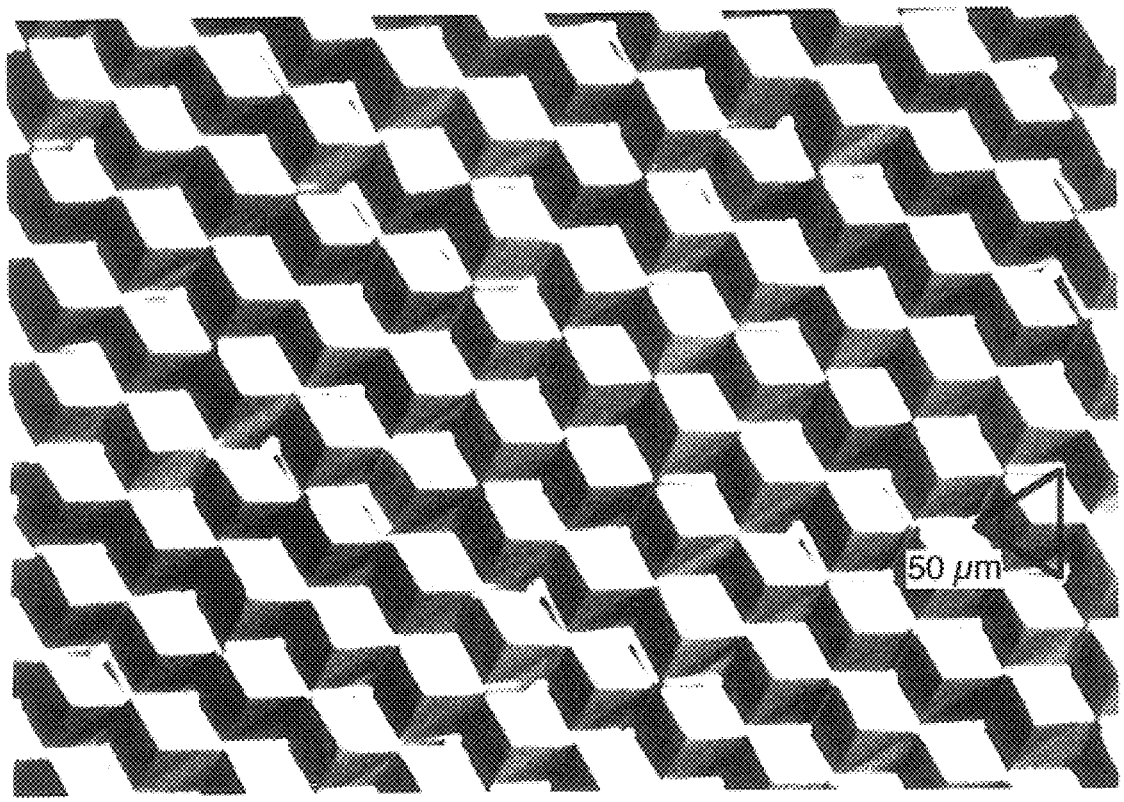
FIGS. 6–8 are images of corner cube structures formed in accordance with the present invention.

The image of FIG. 6 depicts a portion of the resulting crystal corner cube array grown on the first (111) silicon wafer of the first example. The FIG. 6 image was obtained using a Normanski phase microscope at 750× magnification. The portion of the first (111) silicon wafer appearing in FIG. 6 corresponds to the pattern having generally square silicon dioxide pads of about 5×5 micrometers with about 50 micrometer spacing from pad center to pad center. Furthermore, an edge of each pad was generally parallel to a (110) flat of the first (111) silicon wafer. Surface roughness was determined to be less than 30 angstroms for the surfaces of the corner cube structures. This measurement approaches the limit of available equipment.

Figure 7:
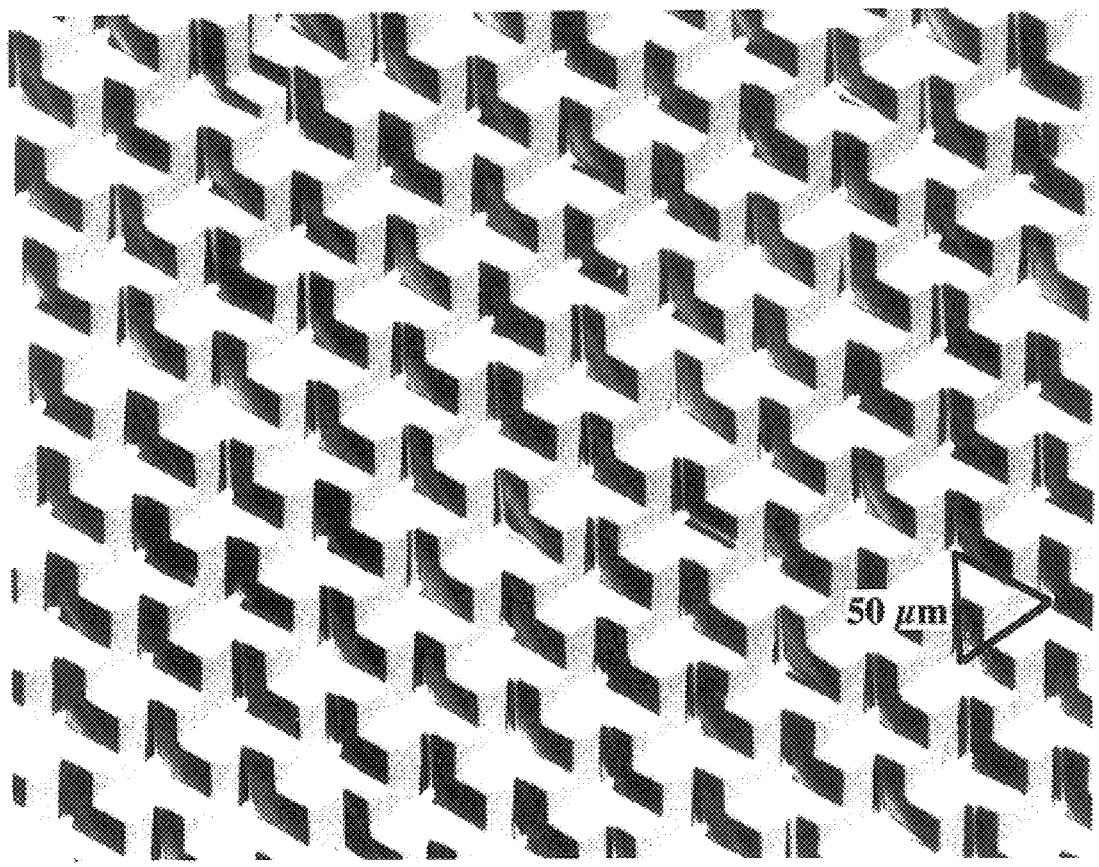

In a second example, a second (111) wafer was processed under generally the same conditions as the first (111) wafer to provide the 155 dies each having the 16 different patterns; however, the pad edges were set at 30 degrees relative to the (110) wafer flat for the second example. The image of FIG. 7 depicts the second (111) wafer after SEG and ELO processing. The cube corners of the second (111) wafer are arranged in a non-standard pattern compared to the corner cube arrays of FIGS. 1 and 6.

Figure 8:
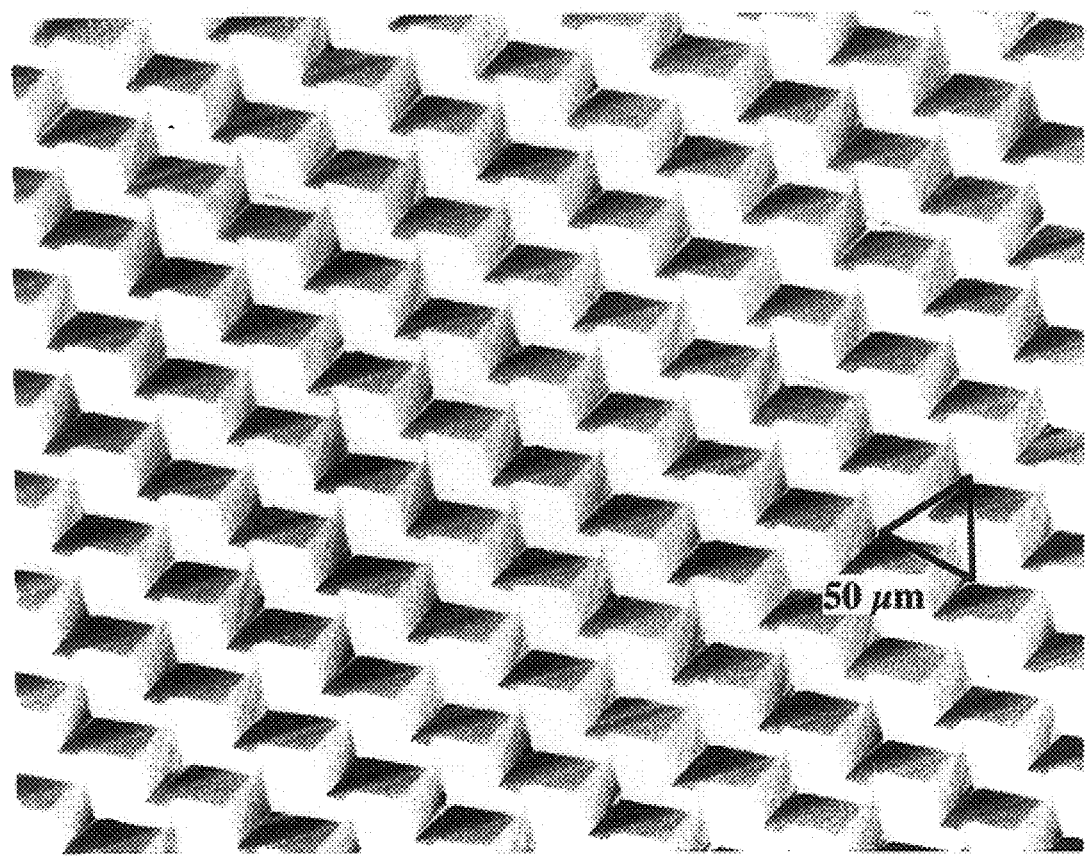

In a third example, a third (111) wafer was processed under generally the same conditions as in the first and second examples, except the pad edges were set at an angle of about 45 degrees which generally corresponds to the angle A shown in FIG. 4. The image of FIG. 8 depicts this third (111) wafer.

Figure 9:
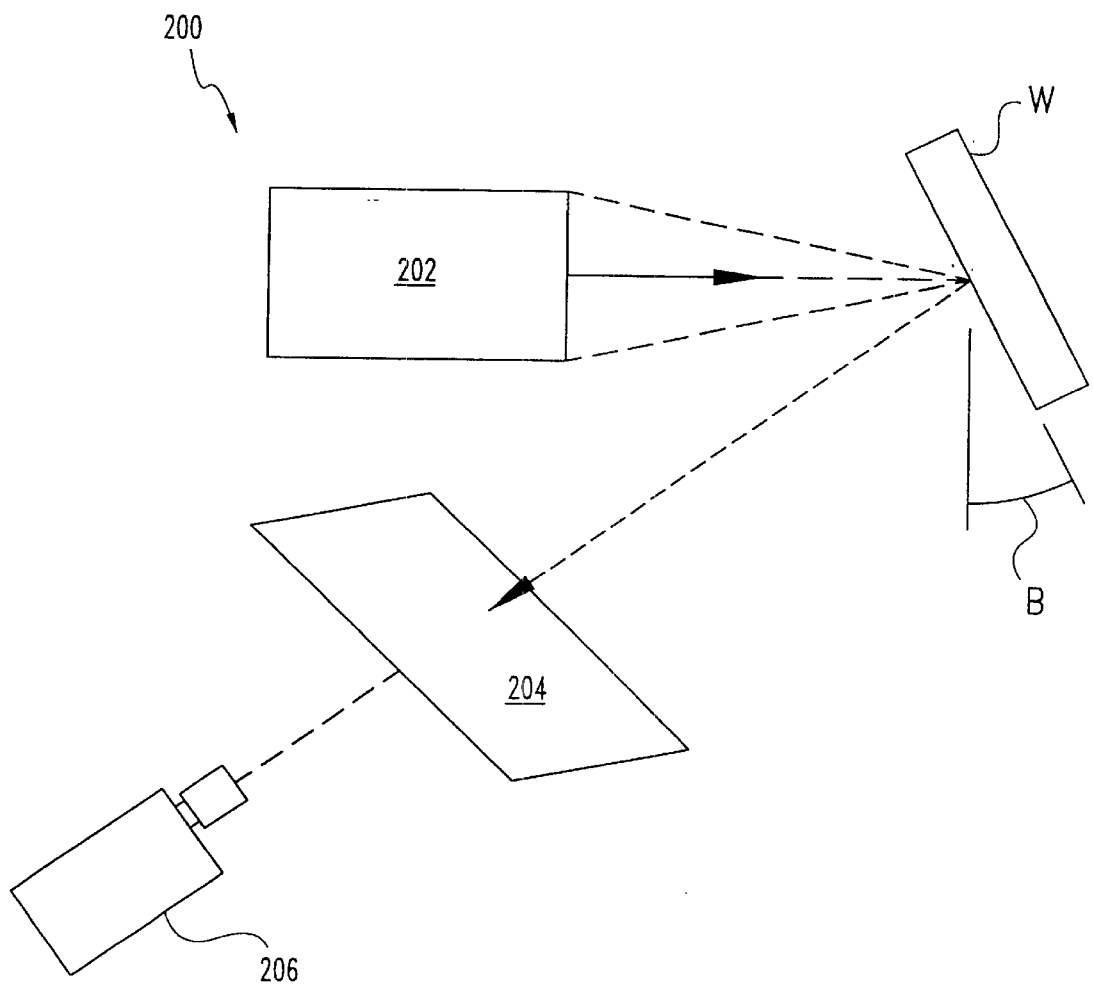
FIG. 9 schematically depicts a test system to evaluate optical properties of a corner cube array of the present invention.

For examples 1–3, additional description is provided in Neudeck et al., Precision Crystal Corner Cube Arrays for Optical Gratings Formed by (100) Silicon Planes with Selective Epitaxial Growth, 35 Applied Optics 3466 (Jul. 1, 1996). Optical grating capability of the cube corner structures of examples 1–3 was evaluated with test system 200 schematically depicted in FIG. 9. System 200 has a laser 202 projecting a He-Ne beam with a wavelength of about 633 nanometers. The beam strikes wafer W from a distance of about 10 meters at an angle B. Angle B was in a range of about 10–15 degrees from normal. A diffraction image was projected on a semi-transparent screen 204 and was photographed with 35 mm camera 206.

Figure 10:
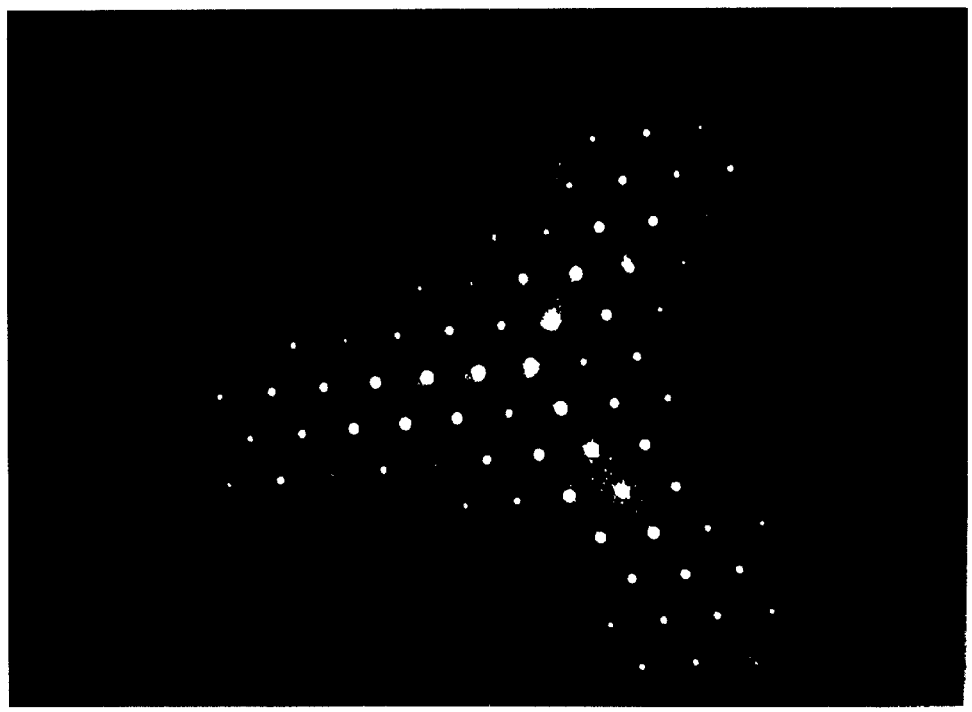
FIG. 10 is an image of a light pattern obtained by testing the corner cube array depicted in the image of FIG. 7 with the test system depicted in FIG. 9.

FIG. 10 illustrates a diffraction pattern obtained with camera 206. This pattern indicates diffraction maxima to seven orders for the non-standard cube corner structure depicted in FIG. 7. The center of the diffraction pattern was bright and consistent with simple mirror optics. When the wafer was tilted or rotated with respect to the beam from laser 202, the projected image followed as if the pattern were drawn on a mirror. No difference in diffraction properties was observed over a wide range of angles. In addition, a retroreflection signal was detected behind laser 202 within a cone of approximately +/−1 degree around laser 202. Results comparable to FIG. 10 were obtained for the first and third (111) wafers of examples 1 and 3.

In a fourth example, comparable conditions were utilized, except triangular-shaped pads were employed. It was discovered that triangular pads are more resistant to epitaxial lateral overgrow compared to the square pads utilized in examples 1–3. Furthermore, it was found through analysis of the results from examples 1–4, that spacing between pads may be varied to adjust cubic projection height from the selective epitaxial crystal growth process, and that epitaxial lateral overgrowth may be controlled by adjusting hydrochloric acid (HCL) in the LPCVD reactor.

A fifth example employs Metal-Organic Vapor Phase Epitaxy (MOVPE) to grow crystal cube corners from a compound selected from the group of gallium arsenide (GaAs), $Al_xGa_{(1-x)}As$, and $Al_xGa_{(1-x)}AsInP$. The crystal cube corners are grown on a substrate with a substrate crystal plane that is oblique with respect to the crystal growth planes of the cube corners. MOVPE epitaxy techniques that may be readily adapted by those skilled in the art to grow crystal cube corners are described in Kuech et al., "The Chemistry and Growth of MOVPE-Based Selective Epitaxy", *Low Dimensional Structures prepared by Epitaxial Growth or Rearowth on Patterned Substrates* pp. 207–217 (1995 Kluwer Academic Publishers); Kuech, Selective Epitaxy of Compound Semiconductors: Novel Sources, 8 Semiconductor Science Technology 967–978 (1993); and Recent Advances in Metal-Organic Vapor Phase Epitaxv, Kuech, 80 Proceedings of the IEEE 1609–1624 (1992).

All publications, patents, and patent applications cited in this specification are herein incorporated by reference as if each individual publication, patent, or patent application were specifically and individually indicated to be incorporated by reference and set forth herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising:

a silicon substrate having a generally cubic crystal lattice;

a number of elements positioned apart from one another in a predetermined spatial pattern, said elements being generally spaced along a plane substantially coplanar with a crystal lattice face of said substrate, said elements being made from a compound selected to spatially control silicon crystal growth; and a number of silicon crystal projections extending from said plane, said projections each having three generally planar surfaces each obliquely oriented with respect to said plane, said projections being spaced apart from each other in accordance with said predetermined pattern of said elements.

2. The combination of claim 1 wherein said projections each generally have a trihedral shape to define a corner cube array suitable for optical device replication.

3. The combination of claim 2 wherein said pattern provides a generally uniform distribution of said projections along at least a portion of said plane.

4. The combination of claim 1 wherein said elements are arranged in a number of staggered rows.

5. The combination of claim 1 wherein center-to-center spacing between adjacent members of said elements is no more than about 200 micrometers.

6. The combination of claim 1 wherein said plane generally corresponds to a (111) crystal face of said substrate, said projections generally extend along a [111] crystal lattice direction, and said surfaces generally correspond to (100), (010), and (001) crystal faces.

7. The combination of claim 1 wherein said pattern defines a group of said elements that are each generally equidistant from six adjacent members of said elements.

8. The combination of claim 6 wherein said elements are made from at least one of silicon dioxide and silicon nitride.

9. A method, comprising:
   selecting a crystalline substrate having a generally planar first surface substantially corresponding to a first crystal face;
   defining a predetermined spatial pattern along the first surface to control crystal growth thereon; and
   depositing a material on the first surface to grow a number of crystals corresponding to the pattern, the crystals having generally the same chemical composition and crystal lattice arrangement as at least a portion of the substrate, the crystals extending from said first surface to define second, third, and fourth generally planar surfaces, the second, third, and fourth surfaces substantially corresponding to second, third, and fourth crystal faces, the second, third, and fourth crystal faces being oblique relative to said first crystal face.

10. The method of claims 10, wherein said substrate has a cubic crystal lattice structure, the first crystal face substantially corresponds to a (111) crystal plane, the second crystal face substantially corresponds to a (100) crystal plane, the third crystal face substantially corresponds to a (010) plane, and the fourth crystal face substantially corresponds to a (001) crystal plane.

11. The method of claim 10, wherein the substrate is generally a single silicon crystal and the compound is silicon.

12. The method of claim 9, wherein said defining includes establishing a number of pads on the first surface to provide the pattern.

13. The method of claim 12, wherein said defining includes providing the pads in staggered rows.

14. The method of claim 12, wherein the pads are made from at least one of $SiO_2$ and $Si_3N_4$.

15. The method of claim 9, wherein said depositing includes epitaxially growing the crystals by chemical vapor deposition, and the crystals are each formed with the second, third, and fourth surfaces being generally mutually perpendicular to define a trihedral shape with an apex.

16. The method of claim 9, wherein the crystals generally define a corner cube array and further comprising forming a replication mold with the corner cube array.

17. A corner cube array, comprising:
   a silicon substrate;
   a number of silicon crystal projections deposited on said substrate to generally extend away from the substrate along a [111] crystal lattice direction, said projections each having a cube corner shape with three generally planar surfaces, said surfaces being generally mutually perpendicular and substantially corresponding to (100), (010), and (001) crystal faces; and
   a number of elements arranged along said substrate to define a crystal growth pattern,
   wherein said projections each have generally the same size and shape and have a generally uniform distribution along at least a portion of said substrate.

18. The corner cube array of claim 17 wherein said elements include a number of pads generally spaced apart from one another along a plane of said substrate, said plane substantially corresponds to a (111) crystal face, and said pads are each made from at least one of silicon dioxide and silicon nitride.

19. The corner cube array of claim 17 wherein said surfaces intersect one another to form an apex and said apex is generally equidistant from three closest surrounding members of said elements.

20. The corner cube array of claim 17 wherein said substrate is a silicon wafer with a flat substantially corresponding to the [110] crystal lattice direction and said elements each have an approximately straight edge oriented generally parallel with said flat.

21. A corner cube array, comprising:
   a silicon substrate;
   a number of silicon crystal projections deposited on said substrate to generally extend away from the substrate along a [111] crystal lattice direction, said projections each having a cube corner shape with three generally planar surfaces, said surfaces being generally mutually perpendicular and substantially corresponding to (100), (010), and (001) crystal faces;
   wherein said projections each have generally the same size and shape and have a generally uniform distribution along at least a portion of said substrate; and
   wherein said projections each have an apex, said apex of one of said projections being spaced apart from said apex of another of said projections by no more than about 1 micrometer.

22. A method for making a corner cube array, comprising:
   processing a silicon substrate having a cubic crystal lattice, the substrate having a surface substantially corresponding to a (111) crystal face;
   establishing a number of silicon crystal growth regions along the surface during said processing, said regions being established in a predetermined pattern; and
   epitaxially growing a cube corner shaped projection on each of the regions, the projection generally extending along a [1111] crystal lattice direction with three generally planar surfaces, the surfaces being generally mutually perpendicular to one another and substantially corresponding to (100), (010), and (001) crystal faces.

23. The method of claim 22 wherein said establishing includes lithographically processing the substrate to provide a number of pads on the surface.

24. The method of claim 22 wherein said epitaxially growing includes exposing the substrate to dichlorosilane, hydrogen, and hydrochloric acid in a vapor deposition reactor.

25. The method of claim 24 wherein the regions are defined by a number of spaced apart silicon dioxide pads and further comprising inhibiting silicon crystal growth on the pads during said exposing by adjusting hydrochloric acid amount.

26. The method of claim 24 further comprising maintaining a pressure of about 40 Torr and a temperature of about 970 degrees celsius in the reactor during said exposing.

27. The method of claim 22, further comprising forming replication tooling from the corner cube array.

28. The method of claim 27, further comprising providing a number of articles with the tooling, the articles each having a surface structure corresponding to the corner cube array.

29. The method of claim 27, wherein said forming includes electroplating the corner cube array to form a replication mold.

30. A method, comprising:

provibing a corner cube array device having a silicon substrate with a generally cubic lattice and a number of silicon crystal projections extending from the substrate, the projections each having three generally planar surfaces, the surfaces each being generally obliquely oriented with respect to a plane of the substrate, the plane substantially corresponding to a (111) crystal face, the projections being oriented along the plane to provide a predetermined corner cube array pattern, the device including a number of elements spaced apart from one another along the substrate to define the pattern; and forming a number of corner cube array articles having a shape substantially corresponding to the corner cube array pattern, wherein the articles each have a number of cube corner projections spaced apart from each other by no more than about 1 micrometer.

* * * * *

UNITED STATES PATENT AND TRADEMARK OFFICE
CERTIFICATE OF CORRECTION

PATENT NO.     : 6,461,003 B1
DATED          : October 8, 2002
INVENTOR(S)    : Gerold W. Neudeck It is certified that error appears in the above-identified patent and that said Letters Patent is hereby corrected as shown below:

Title page,
Item [56], OTHER PUBLICATIONS,
"T.F. Kuech, S. Nayak" reference, please change "of" to -- or --
"R. Bashire" reference, please change "Bashire" to -- Bashir --

Column 11,
Line 39, please change "claims 10" to -- claim 9 --
Line 52, please change "[1111]" to -- [111] --

Signed and Sealed this

Tenth Day of June, 2003

JAMES E. ROGAN
*Director of the United States Patent and Trademark Office*